United States Patent [19]

Alfon et al.

[11] Patent Number: 4,881,389
[45] Date of Patent: Nov. 21, 1989

[54] ANTI-THEFT DEVICE FOR AUTOMOBILE VEHICLES

[76] Inventors: José Alfon; Alberto Martínez; Abelardo Martínez, all of Final Ave. La Industria, Galpón No. 2, Urb. Industrial Palo Verde - Petare, Caracas, Venezuela

[21] Appl. No.: 126,661

[22] Filed: Dec. 1, 1987

[51] Int. Cl.$^4$ .............................................. E05B 13/10
[52] U.S. Cl. ........................................ 70/209; 70/216; 70/224; 74/552; 280/775
[58] Field of Search ................... 74/552, 556; 70/252, 70/237, 209, 207, 215–217, 224; 280/775

[56] References Cited

U.S. PATENT DOCUMENTS

| | | | |
|---|---|---|---|
| 1,261,151 | 4/1918 | Mueller | 74/556 |
| 1,348,547 | 8/1920 | Davidson | 70/216 |
| 1,358,106 | 11/1920 | Payton | 74/556 |
| 1,453,256 | 4/1923 | Ganz | 70/216 |
| 1,459,090 | 6/1923 | Donaldson | 70/209 |
| 1,657,402 | 1/1928 | Kenworthy et al. | 70/252 |
| 2,085,725 | 7/1937 | Briggs | 70/163 |
| 2,580,894 | 1/1952 | De Hoffmann | 70/216 |
| 4,158,952 | 6/1979 | Oliver et al. | 70/386 X |
| 4,659,244 | 4/1987 | Malvy et al. | 74/552 X |

FOREIGN PATENT DOCUMENTS

| | | | |
|---|---|---|---|
| 0162986 | 12/1985 | European Pat. Off. | 180/287 |
| 0210324 | 2/1987 | European Pat. Off. | 70/252 |
| 619103 | 9/1935 | Fed. Rep. of Germany | 70/216 |
| 604362 | 5/1926 | France | 74/552 |
| 2537517 | 6/1984 | France | 70/252 |
| 2575713 | 7/1986 | France | 70/252 |
| 2584353 | 1/1987 | France | 70/252 |
| 221060 | 9/1924 | United Kingdom | 70/218 |
| 1038864 | 8/1966 | United Kingdom | 70/185 |

Primary Examiner—Lloyd A. Gall
Attorney, Agent, or Firm—Pennie & Edmonds

[57] ABSTRACT

The invention relates to anti-theft devices for automobile vehicles in which such devices are fixed on the steering column of the vehicle. The invention provides an anti-theft device which can render the steering mechanism unserviceable by a special lock system which makes it easy to mount and remove the steering wheel when the vehicle is parked.

The device comprises a fastening cylinder secured firmly to the steering column, a lock casing which passes through the steering wheel, and by means of a cylinder lock, secures the steering wheel firmly to the fastening cylinder and the steering column.

2 Claims, 4 Drawing Sheets

4,881,389

ANTI-THEFT DEVICE FOR AUTOMOBILE VEHICLES

BACKGROUND OF THE INVENTION

Field of the Invention

The invention relates to the anti-theft devices for automobile vehicles, in which such devices are fixed on the steering column, in order to render the steering mechanism unserviceable by removing the steering wheel.

STATEMENT OF PRIOR ART

In known anti-theft devices as described in U.S. Pat. No. 4,352,278 and U.S. Pat. No. 4,282,730 the device is fixed on the steering column, and comprises a mechanism in which a locking bolt interacts with the steering column in order to block the latter, when the device is in the locking position.

As the number of stolen vehicles is still increasing, the need for additional anti-theft device is growing.

OBJECTS OF THE INVENTION

The purpose of the present invention is to provide an anti-theft device, which can be adapted to steering columns of very different vehicles as an additional or as the only anti-theft device.

SUMMARY OF THE INVENTION

For this purpose the anti-theft device according to the invention is characterized by, that the said device consists of a fastening cylinder which is bored to fit the steering column and is firmly secured on top of this, and a steering wheel fixed axially and non-rotative to the fastening cylinder by means of a key-operated lock enclosed in a lock casing, which passes through openings in the central part of the steering wheel and enters in a hollow part of the fastening cylinder and locks the parts together as a unit.

BRIEF DESCRIPTION OF THE DRAWINGS

The invention will be clearly understood on reading of the following description given with reference to the accompanying drawing, wherein.

DETAILED DESCRIPTION OF THE INVENTION

Figure 1:
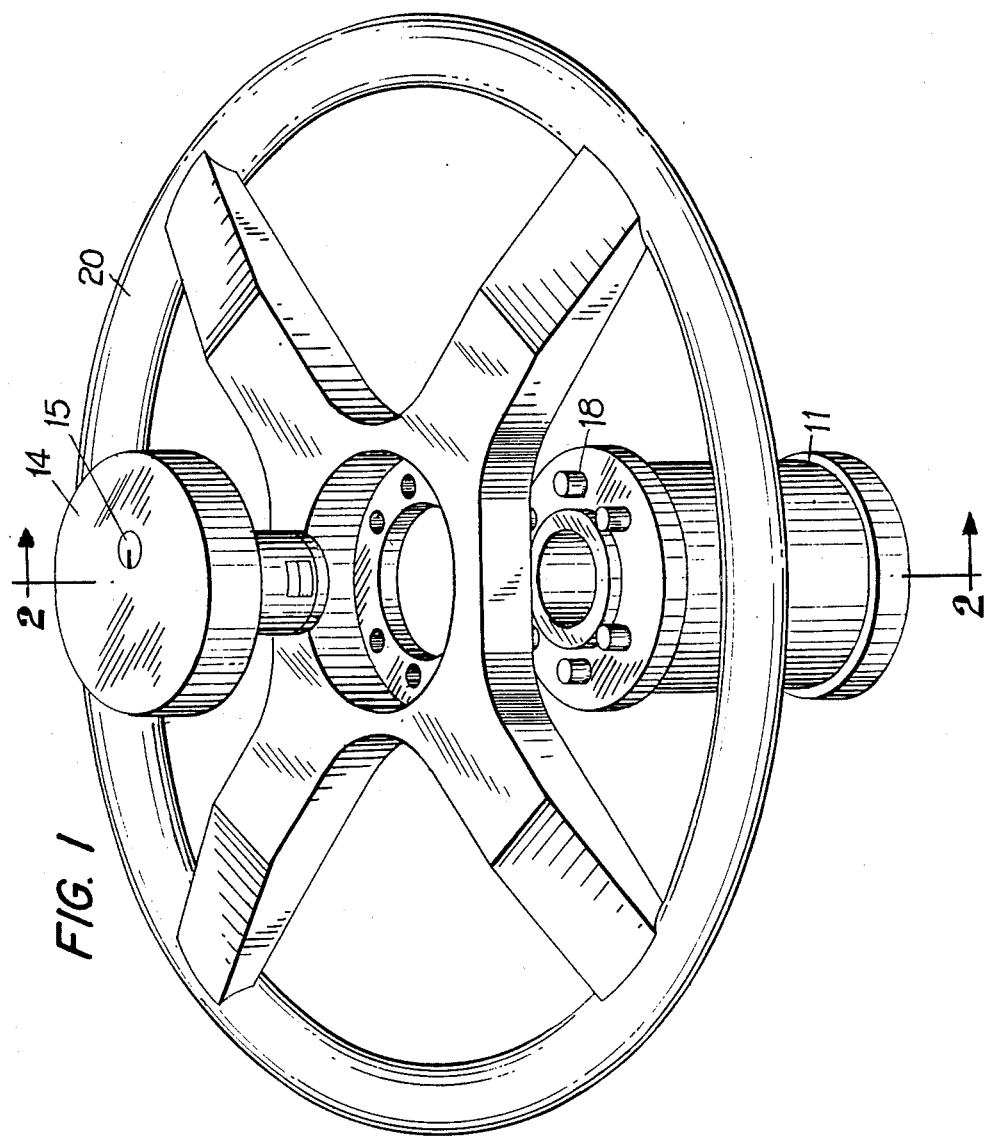
FIG. 1 is an exploded perspective view of the prefered embodiment of the invention.
Figure 2:
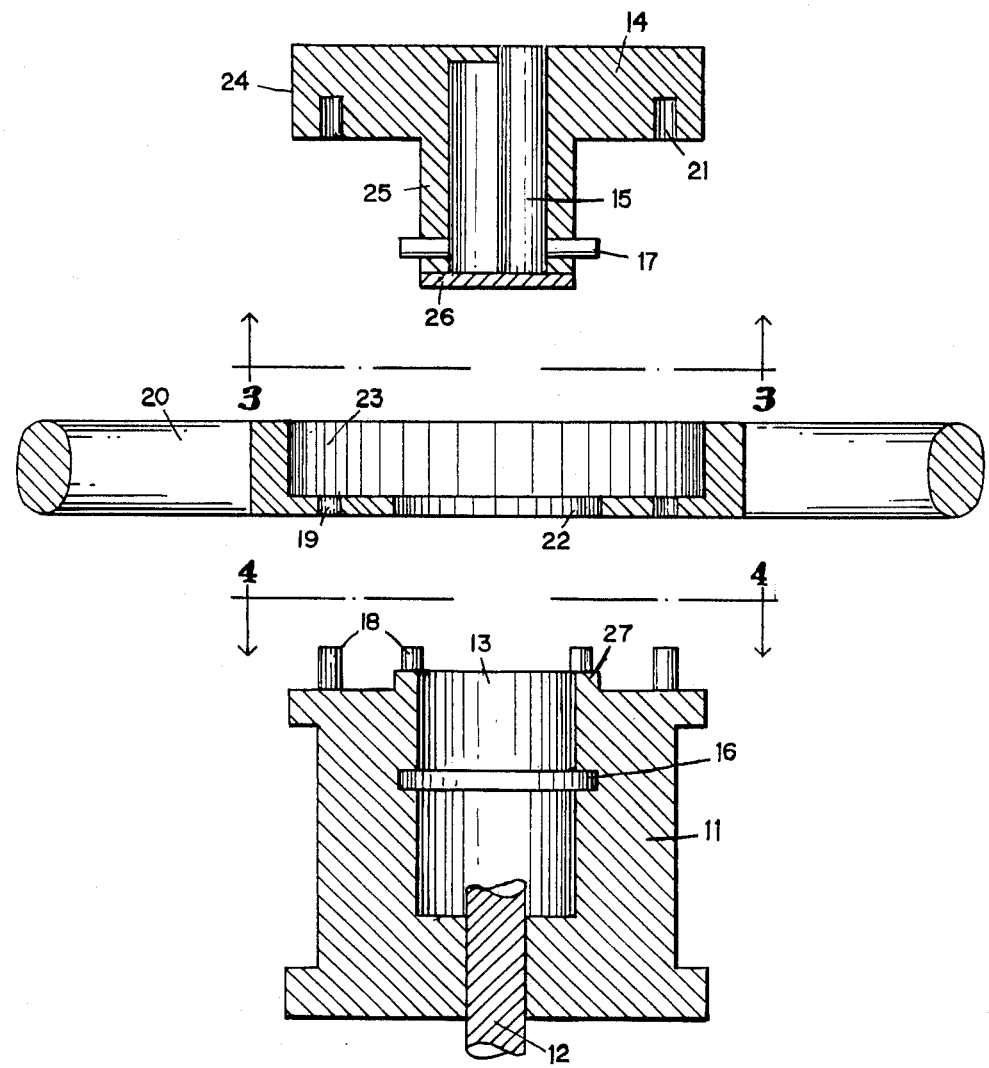
FIG. 2 is a cross section taken along the line 2—2 in FIG. 1.
Figure 3:
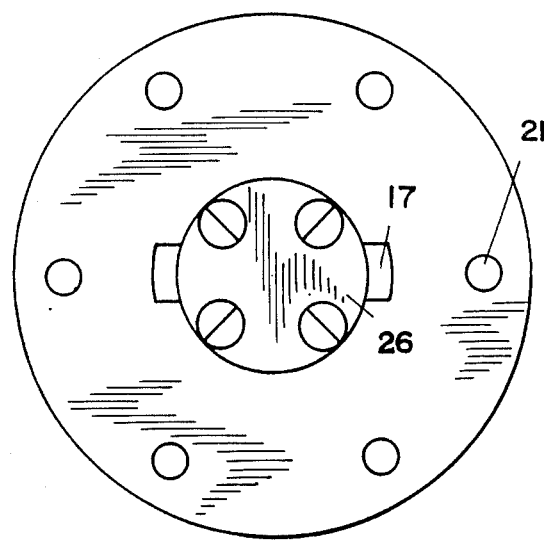
FIG. 3 is a plan view taken along the line 3—3 in FIG. 2.
Figure 4:
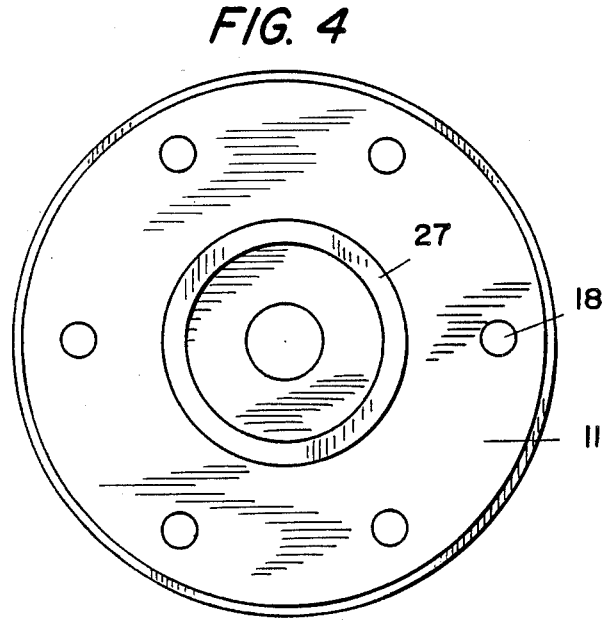
FIG. 4 is a plan view taken along the line 4—4 in FIG. 2.
Figure 5:
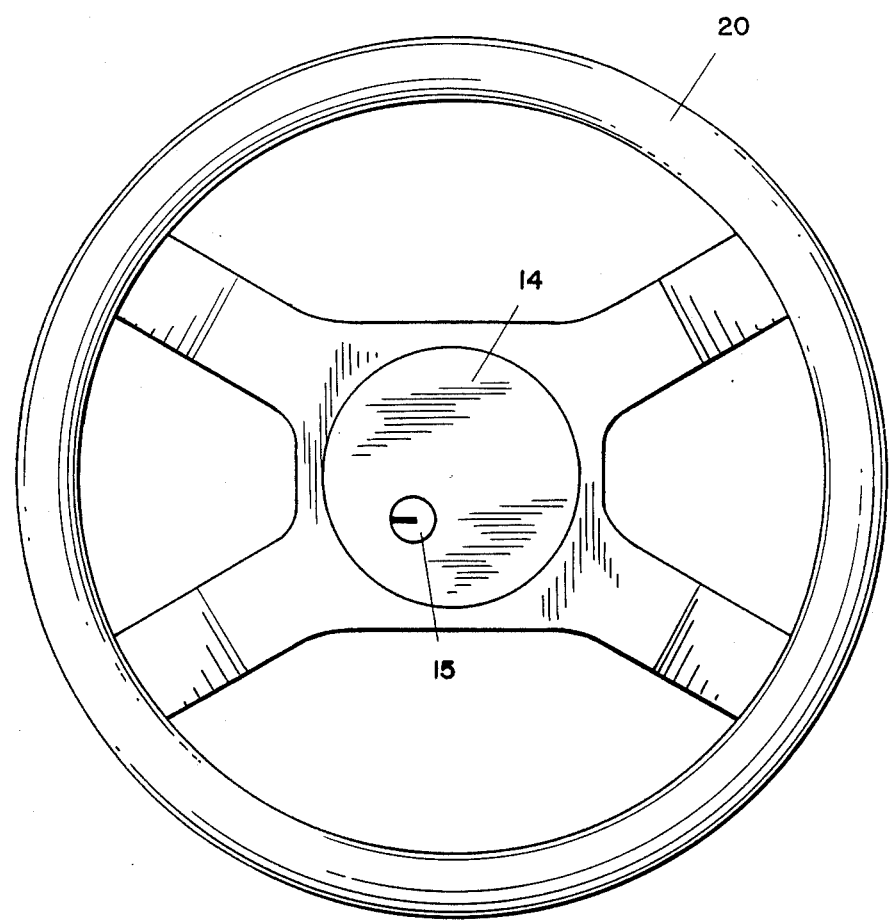
FIG. 5 is a plan view of the steering wheel of FIG. 1.

Referring to FIG. 1 and 2 a prefered form of the anti-theft device consists of a fastening cylinder 11 secured in the ordinary way to the steering column 12 of the vehicle.

The fastening cylinder 11 has a cylindrical opening 13 with a bottom, where a hole for the colocation of the steering column 12 passes through. The cylindrical opening 13 serves for the fastening of the steering column 12 and the lock casing 14 to the fastening cylinder 11. The cylindrical opening 13 has a cylindrical recess 16 with a greater diameter than the opening itself for the penetration of the locking bolts 17 of the cylinder lock 15, which is placed inside the lock casing 14.

On top of the fastening cylinder 11 are placed six studs 18 which fit into six holes 19 in the steering wheel 20 and into six holes 21 in the lock casing, so that the steering wheel 20, the lock casing 14, and the fastening cylinder 11 can be turned as one unit without slack.

The top of the fastening cylinder 11 is formed with a projection 27 which fits into a central hole 22 of the steering wheel 20. The steering wheel itself can be of any known type, but besides the holes 19 for the studs 18 and the central hole 22, the central part of the steering wheel has a cylindrical opening 23 on the opposite side of the central hole 22 and with a greater diameter and a bottom, where the central hole 22 and the holes 19 are passing through.

The lock casing 14 consists of a flange 24 which fits into the cylindrical opening 23 of the steering wheel 20 and a hollow cylinder 25, which fits into the cylindrical opening 13 of the fastening cylinder 11, and has room for the cylinder lock 15. It is closed at the lower end with a plate 26, which is secured by four screws.

The other end is partly closed by the flange, which only has a hole for that part of the cylinder lock into which the key is entering. Besides these openings the wall of the lock casing cylinder 25 has openings for the locking bolts 17 of the cylinder lock 15.

The anti-theft device is assembled in the following way. The fastening cylinder 11, which is preferably made of aluminum is secured to the steering column 12, usually by means of a nut screwed on the column. Once the fastening cylinder 11 is firmly secured to the column 12, the steering wheel 20 is put on the top, so the studs 18 go through the holes 19, and the projection 27 enters in the central opening 22 of the steering wheel. The next step consists in placing the lock casing 14 so the studs 18 are passing into the holes 21 and the flange 24 goes into the cylindrical opening 23 of the steering wheel, and the lock casing cylinder 25 passes into the cylindrical opening 13 of the fastening cylinder 11.

Finally the key is turned around in the cylinder lock 15, so the lock bolts 17 are passing into a recess 16 extending annularly around the cylinder 11 and in this way locks the steering wheel 20 firmly to the lock casing 11, where by it is also secured to the steering column.

The anti-theft device workers in that way, that the driver only needs to turn the key around in the cylinder lock 15 and lift the lock casing 14, whereupon the steering wheel can be removed, and the lock casing 14 placed at its usual place and locked again, so another steering wheel cannot be placed until the lock casing 14, is unlocked. When the car is parked, the driven can take the steering wheel away in his suitcase, or put it in a safe place.

It is to be understood that the form of this invention as shown is merely a preferred embodiment. It will be appreciated, that many modifications and changes may be made by those skilled in the art, without departing from the spirit of the invention. It is intended, therefore, by the appended claims to cover all such modifications and changes as fall within the true spirit and scope of the invention.

We claim:

1. An anti-theft device for preventing unauthorized use or theft of vehicles by rendering the steering mechanism unserviceable, comprising:

a. a hollow fastening cylinder secured firmly to the steering column;

b. a steering wheel with a cylindrical opening in the upper side of the central part, said opening having a central hole; and c. a lock casing removably mounted with its upper flanged part in the cylindrical opening of the steering wheel, and its lower cylindrical part in the hollow part of the fastening cylinder, axially and radially secured as well to the steering wheel as to the fastening cylinder, wherein said steering wheel, said fastening cylinder and said lock casing are mutually secured radially by means of studs placed on top of the fastening cylinder entering through suitable holes in the steering wheel into convenient holes in said lock casing.

2. An anti-theft device for preventing unauthorized use or theft of vehicles by rendering the steering mechanism unserviceable, comprising:

a. a hollow fastening cylinder secured firmly to the steering column;

b. a steering wheel with a cylindrical opening in the upper side of the central part, said opening having a central hole; and c. a lock casing removably mounted with its upper flanged part in the cylindrical opening of the steering wheel, and its lower cylindrical part in the hollow part of the fastening cylinder, axially and radially secured as well to the steering wheel as to the fastening cylinder, wherein said lock casing and said steering wheel are secured in their axial position by means of a cylinder lock positioned in said lock casing, having locking bolts which in their locked position extend into openings in the wall of the lock casing into an annular recess of the wall of said hollow part of said fastening cylinder.

* * * * *